United States Patent [19]
Takeuchi

[11] Patent Number: 5,673,108
[45] Date of Patent: Sep. 30, 1997

[54] LIGHT RETURN LOSS MEASUREMENT SYSTEM AND METHOD

[75] Inventor: Nobunari Takeuchi, Tokyo, Japan

[73] Assignee: Ando Electric Co., Ltd., Tokyo, Japan

[21] Appl. No.: 621,964

[22] Filed: Mar. 26, 1996

[30] Foreign Application Priority Data

Mar. 31, 1995 [JP] Japan .................... 7-100308

[51] Int. Cl.$^6$ .................... G01N 21/84
[52] U.S. Cl. .................... 356/73.1
[58] Field of Search .................... 356/73.1, 243

[56] References Cited

U.S. PATENT DOCUMENTS 4,497,575  2/1985  Phillipp .................... 356/243 X
4,921,347  5/1990  Wong et al. .................... 356/243 X

OTHER PUBLICATIONS

Tateda et al "Optical Loss Measurement in Graded-Index Fiber Using a Dummy Fiber" Applied Optics, vol. 18, No. 19, 1 Oct. 1979, pp. 3272–3275.

Primary Examiner—Vincent P. McGraw
Attorney, Agent, or Firm—Finnegan, Henderson, Farabow, Garrett & Dunner, L.L.P.

[57] ABSTRACT

A light return loss measurement method and system with an optical time domain reflectometer (OTDR) which displays an output of an arithmetic circuit. The method and system permits measurement of the light return loss over an arbitrary interval of an optical fiber. The system's arithmetic circuit calculates light return loss across a measurement interval set in a display waveform data by dividing a predetermined light return loss and integrating the measured waveform by multiplying the set interval by a light interception correction constant. The integration performed is a quadrature of various sections of an optical fiber. The light return loss measurement method and system also permits easy calibration of the light return loss in the OTDR.

13 Claims, 5 Drawing Sheets

LIGHT RETURN LOSS MEASUREMENT SYSTEM AND METHOD

BACKGROUND OF THE INVENTION

1. Field of the Invention

The present invention relates to an OTDR used for measuring the light return loss of a path of light over an arbitrary interval.

2. Description of the Related Art

The configuration of a current OTDR is shown in FIG. 6. In FIG. 6, numeral 1 refers to a pulse generation circuit, 2 to an electricity-light conversion circuit, 3 to a directional coupler, 4 to the optical fiber to be measured, 5 to a light-electricity conversion circuit, 6 to an amplification circuit, 7 to an A/D converter, 12 to an arithmetic circuit, 13 to a marker input circuit, and 14 to a display circuit.

In FIG. 6, the pulse generation circuit 1 produces a pulse, which is input into the electricity-light conversion circuit 2. The electricity-light conversion circuit 2 converts the pulse from the pulse generation circuit 1 to a light pulse, which is transmitted through the directional coupler 3, into the optical fiber to be measured 4. The backward scattered light and Fresnel reflected light produced in the optical fiber, flows back in the opposite direction to the transmitted light pulse, back through the directional coupler 3, and into the light-electricity conversion circuit 5. The light-electricity conversion circuit 5 converts the backward scattered light and Fresnel reflected light into an electrical signal, which is amplified by input into the amplification circuit 6. The amplified electrical signal from the amplification circuit 6 is then input into the A/D converter 7, converted to a digital signal, and the signal wave form then displayed via the display circuit 14.

In the case of measuring the light return loss of an optical connector used to connect lengths of optical fiber, the wave form displayed via the display circuit 14 is marked, using the marker input circuit 13, at the point of Fresnel reflection from the optical connector, and at the point of backward scattering immediately prior to that. The arithmetic circuit 12 uses the difference in level of the 2 points set by the marker, and the loss of backward scattered light, to compute the light return loss of the optical connector, which is then displayed on the display circuit 14.

Optical fibers used in optical communications are generally linked with multiple optical connectors. In analog modulated optical communications, the occurrence of reflections in the light path causes a deterioration in the S/N ratio of the transmitted signal, and it is thus necessary to determine the light return loss of the optical fiber transmission path. In such cases, the OTDR configuration outlined in FIG. 6 will allow determination of the light return loss of the various optical connectors at an arbitrary point, by setting markers in the marker input circuit. However, measurement of the total light return loss across multiple optical connectors in differing posts, i.e., the light return loss across any entire arbitrary interval; or alternatively, measurement of light return loss which includes backward scattered light, is difficult and problematic.

Furthermore, there is a method for determining the light return loss by combining a CW light source and a power meter, but although this method allows the determination of the light return loss across the whole optical fiber, it does not allow determination of the light return loss for an arbitrary interval of the optical fiber.

SUMMARY OF THE INVENTION

It is an object of the present invention to provide an OTDR which enables, regardless of the presence or lack of optical connectors, the simple determination of the light return loss across an arbitrary interval of a light path which also includes light return loss due to backward scattered light.

In order to achieve this object, the OTDR for measuring light return loss according to the present invention involves an OTDR which displays an output of an arithmetic circuit 8 and incorporates; a pulse generation circuit 1 for generating a pulse, an electricity-light conversion circuit 2 for converting the output from the pulse generation circuit 1 to a light pulse, a directional coupler 3 for transmitting the output from the electricity-light conversion circuit 2 to an optical fiber to be measured 4 and for inputting the return light into a light-electricity conversion circuit 5 for converting to an electrical signal, an A/D converter 7 for A/D converting the output from the light-electricity conversion circuit 5, a display circuit 11 for taking the output from the A/D converter 7 and displaying the measured waveform data, a marker input circuit 9 for setting a measurement interval in the waveform data displayed via the display circuit 11, and an arithmetic circuit 8 for calculating the light return loss across the interval set by the marker input circuit 9, and is characterized in that there is provided a light return loss input circuit 10 for inputting the light return loss for a calibration optical fiber having a predetermined light return loss value, and in that the operation involves; at first setting a predetermined light return loss for the above mentioned calibration optical fiber in the light return loss input circuit 10, connecting a calibration optical fiber, having said predetermined light return loss, to said OTDR and measuring the light return loss, determining a light interception gain correction constant G in the arithmetic circuit 8 by dividing said predetermined light return loss set in the light return loss input circuit 10 by said measured light return loss, then connecting the optical fiber to be measured 4 to said OTDR, and setting the arbitrary interval for which the light return loss is to be determined in the marker input circuit 9, determining with the arithmetic circuit 8 the light return loss by integrating the measured wave form data for the set interval with respect to distance, multiplying this by said light interception gain correction constant G, and then displaying the light return loss R for the particular interval of the optical fiber 4 set by the marker input circuit 9. The returning light may include both backward scattered light and Fresnel reflected light. Moreover, a dummy optical fiber 29 may be inserted between the directional coupler 3 and the optical fiber being measured 4.

In order to determine the light return loss, it is necessary to determine the relative ratio of reflected light to outgoing light. Current OTDRs have the ability to intercept backward scattered light and Fresnel reflected light and display the wave forms, but the intercepted wave forms are displayed as relative values, and it is not possible to display the values relative to the outgoing light, nor the absolute values.

With the present invention, the ratio of the true value to the actual measured value, namely the OTDR light interception gain correction constant G, is determined by measuring the reflected light from a calibration optical fiber, having a predetermined light return loss, and then dividing this predetermined light return loss for the calibration optical fiber by the actual measured light return loss. Furthermore, as it is sufficient to know the light return loss for the entire calibration optical fiber, this value can be easily obtained by using a light return loss measuring device combining a typical CW light source and a light power meter.

Next, a figure detailing the configuration of the OTDR of the present invention is shown in FIG. 1. In FIG. 1, numeral 8 refers to an arithmetic circuit, 9 to a marker input circuit, 10 to a light return loss input circuit, and 11 to a display circuit, with the remaining numerals being as described for FIG. 6. Namely, instead of the arithmetic circuit 12, the marker input circuit 13, and the display circuit 14 of FIG. 6, in FIG. 1 an arithmetic circuit 8, a marker input circuit 9, a light return loss input circuit 10, and a display circuit 11 are connected.

The arithmetic circuit 8 carries out integration across the interval set in the marker input circuit 9. Generally speaking, the measured wave form should be integrated with respect to time across the interval set by the marker. However, the OTDR measures the light interception signal from the backward scattered light and the Fresnel reflected light as a function of time. Furthermore, it is usual to display the time in terms of the round trip distance the light travels along the inside of the optical fiber. Consequently, integrating the interval set in the marker input circuit 9 with respect to distance is equivalent to integrating with respect to time. With the present invention, the analog light interception signal is converted to a digital signal by an A/D converter 7, with this digital signal then computed by the arithmetic circuit 8. Consequently, the integration performed by the arithmetic circuit 8 is actually carrying out a quadrature of the various sections.

By using the present invention, measurement of the light return loss over an arbitrary interval, which has proved impossible by current techniques, can be easily accomplished. Furthermore, the light return loss of the measuring device, the OTDR, can also be easily calibrated.

DESCRIPTION OF THE PREFERRED EMBODIMENTS

Figure 1:
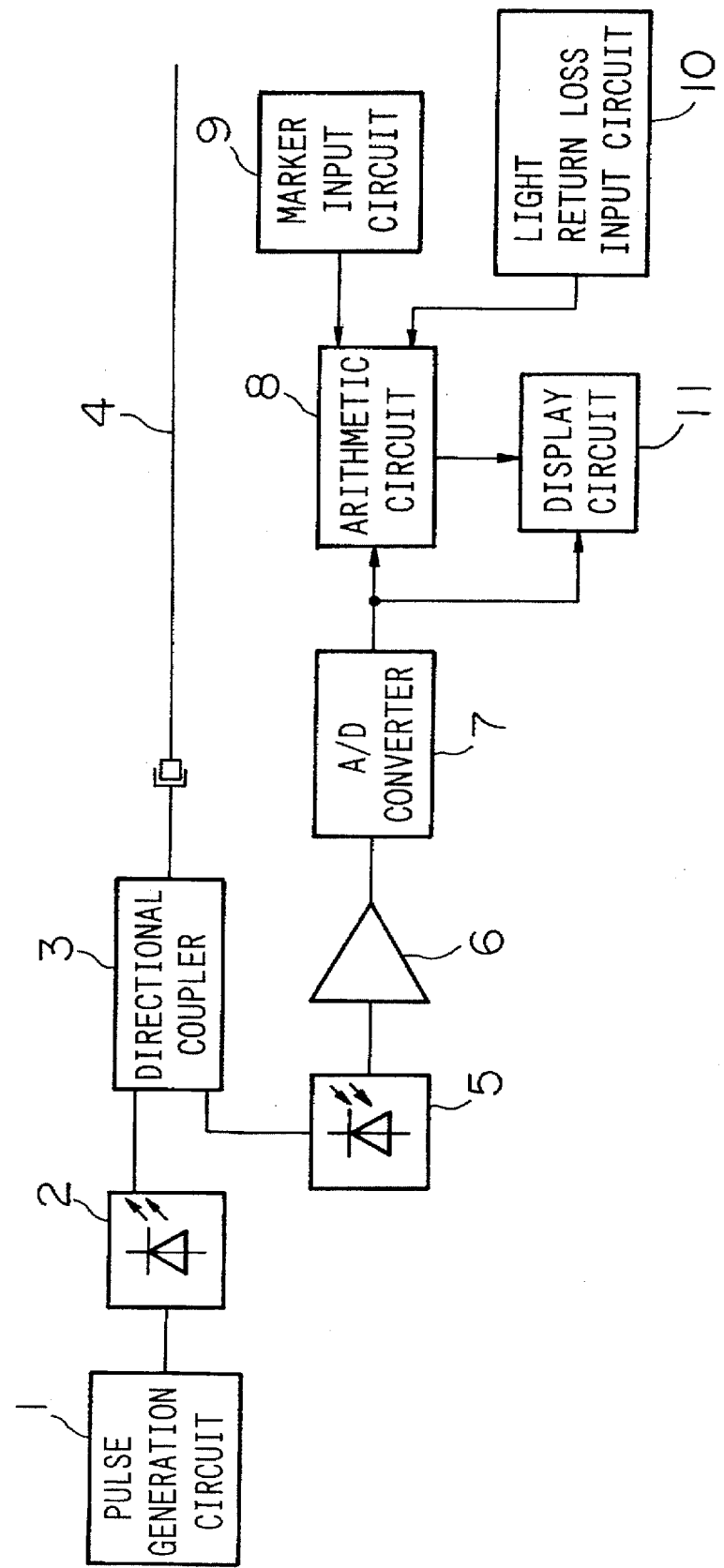
FIG. 1 is a configuration diagram of the OTDR of the present invention.

Next is an explanation of the operation of the present invention with reference to FIG. 1. In FIG. 1, the pulse generation circuit 1 produces a pulse, which is input into the electricity-light conversion circuit 2. The electricity-light conversion circuit 2 converts the pulse from the pulse generation circuit 1 to a light pulse, which is transmitted through the directional coupler 3, into the optical fiber to be measured 4. The backward scattered light and Fresnel reflected light produced in the optical fiber 4, flows back in the opposite direction to the transmitted light pulse, back through the directional coupler 3, and into the light-electricity conversion circuit 5. The light-electricity conversion circuit 5 converts the backward scattered light and Fresnel reflected light into an electrical signal, which is amplified by input into the amplification circuit 6. The amplified electrical signal from the amplification circuit 6 is input into the A/D converter 7, converted to a digital signal, and the signal wave form then displayed via the display circuit 11.

Next, the determination of the light return loss for an arbitrary interval is explained with reference to FIG. 1. In FIG. 1, before the light return loss for the optical fiber is measured, the light interception gain correction constant G must be determined. Consequently, the first step involves connection of a calibration optical fiber, with a predetermined light return loss, in place of the optical fiber 4, and subsequent measuring of the wave form of the backward scattered and Fresnel reflected light.

Next, the marker input circuit 9 is used to set the interval as the entire calibration optical fiber. From the measured wave form data, the arithmetic circuit 8 then integrates the entire interval set in the marker input circuit 9 with respect to distance. As mentioned previously, because the wave form of the backward scattered and Fresnel reflected light is converted, via an A/D converter, to a digital rather than an analog signal, the arithmetic circuit 8 determines not the integral but the quadrature of the various sections. The light return loss thus obtained is termed Rref, and the predetermined light return loss of the calibration optical fiber is termed Rstd. The predetermined light return loss Rstd is set by the calibration fiber light return loss input circuit 10. The arithmetic circuit 8 performs equation (1) to determine the light interception gain correction constant G.

$$G = Rstd/Rref \qquad (1)$$

Next, the calibration optical fiber is removed, and the optical fiber to be measured 4 is connected. Measurement of the optical fiber 4 is carried out in the same way as for the calibration optical fiber, with the measured wave form being displayed via the display circuit 11. Next, the interval across which the light return loss is to be determined is set in the marker input circuit 9. The arithmetic circuit 8 then carries out a quadrature of the sections for the measured wave form across the interval specified in the marker input circuit 9. This value is termed the light return loss Rmes, and the arithmetic circuit 8 then calculates the light return loss R via equation (2).

$$R = Rmes \cdot G \qquad (2)$$

The display circuit 11 then displays the light return loss value R calculated by the arithmetic circuit 8.

Figure 2:
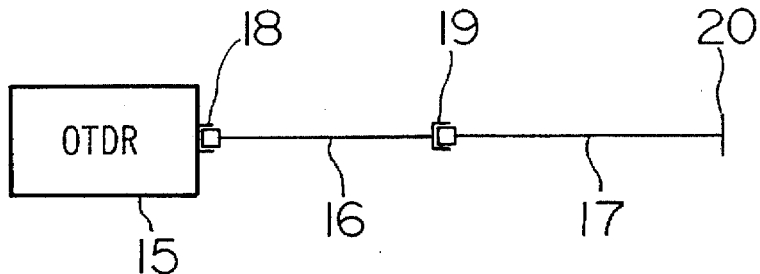
FIG. 2 is a diagram detailing the usage of the OTDR of the present invention.

Next, the usage of the OTDR for the present invention is explained with reference to FIG. 2. Numeral 15 refers to the OTDR of the present invention, 16–17 to the optical fiber to be measured, 18–19 to optical connectors, and 20 to the extremity. In FIG. 2, one end of the optical fiber 16 is connected to the OTDR 15 via an optical connector 18. Furthermore, the other end of the optical fiber 16, is connected to one end of the optical fiber 17 via the optical connector 19. The other end of optical fiber 17 is the extremity 20.

Figure 3:
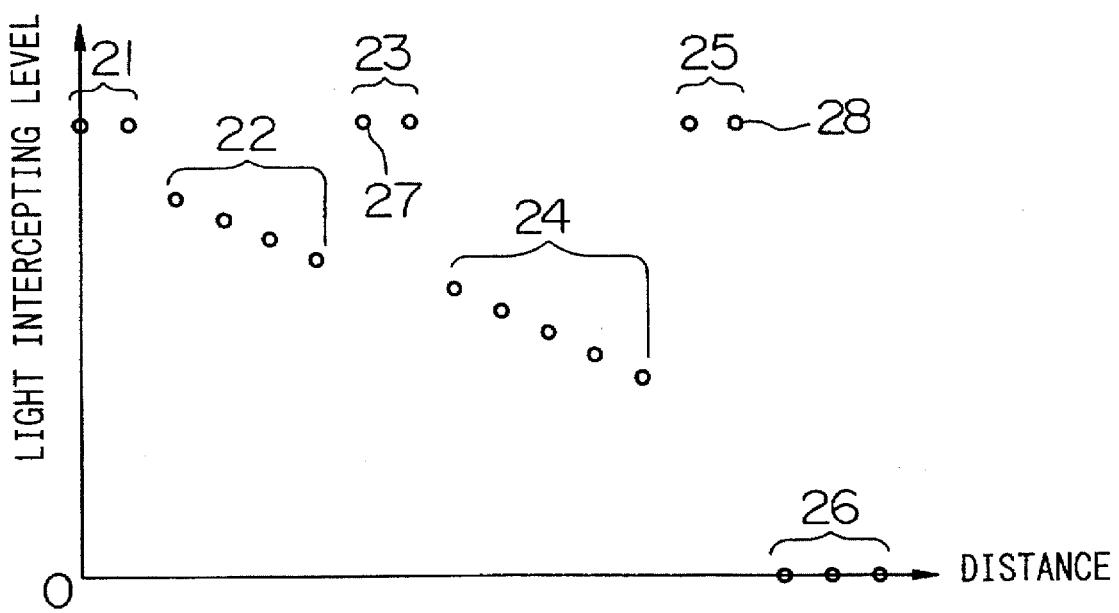
FIG. 3 shows an example of a displayed wave form for the OTDR of FIG. 2.

An example of the wave form displayed by the OTDR in FIG. 2 is shown in FIG. 3. Next is an explanation of the calculation of the light return loss across an arbitrary interval. In FIG. 3 the vertical axis indicates the light interception signal level, and the horizontal axis indicates distance. Because the light interception signals are digital signals, they are discrete values as shown in FIG. 3, where each value is shown as a small circle (o). In FIG. 3, interval 21 represents the Fresnel reflected light from the optical connector 18, and interval 22 the backward scattered light from optical fiber 16. Furthermore, interval 23 represents the Fresnel reflected light from the optical connector 19, and interval 24 the backward scattered light from optical fiber 17. Interval 25 represents the Fresnel reflected light from the extremity 20, and interval 26 represents the intervals with no optical fiber.

In order to determine, for example, the light return loss for the interval between the optical connector 19 and the optical fiber extremity 20 of FIG. 2, the beginning point 27 of the Fresnel light reflection wave form of optical connector 19, and the end point 28 of the Fresnel reflected light from the optical fiber extremity 20 (all in FIG. 3) are set via the marker input circuit 9. The signal wave form is termed f(x), the beginning point 27 of the Fresnel light reflection wave form termed X1, the end point 28 of the Fresnel light reflection wave form termed X2, and the sampling interval of the signal wave form termed ΔX. The return loss Rmes is calculated in the arithmetic circuit 8 by equation (3).

$$Rmes = \sum_{X=X1}^{X2} f(X) \cdot \Delta X \qquad (3)$$

Furthermore, measurement of the calibration optical fiber is carried out in exactly the same manner. In this case the markers should be set at the beginning point of the Fresnel reflection from the beginning point of the fiber, and at the end point of the Fresnel reflection from the extremity of the fiber.

Using equation 2, the arithmetic circuit 8 then multiplies the light return loss value Rmes, from equation (3), by the OTDR's light reception gain correction constant G, to obtain the light return loss for the interval between points 27 and 28 shown in FIG. 3.

Figure 4:
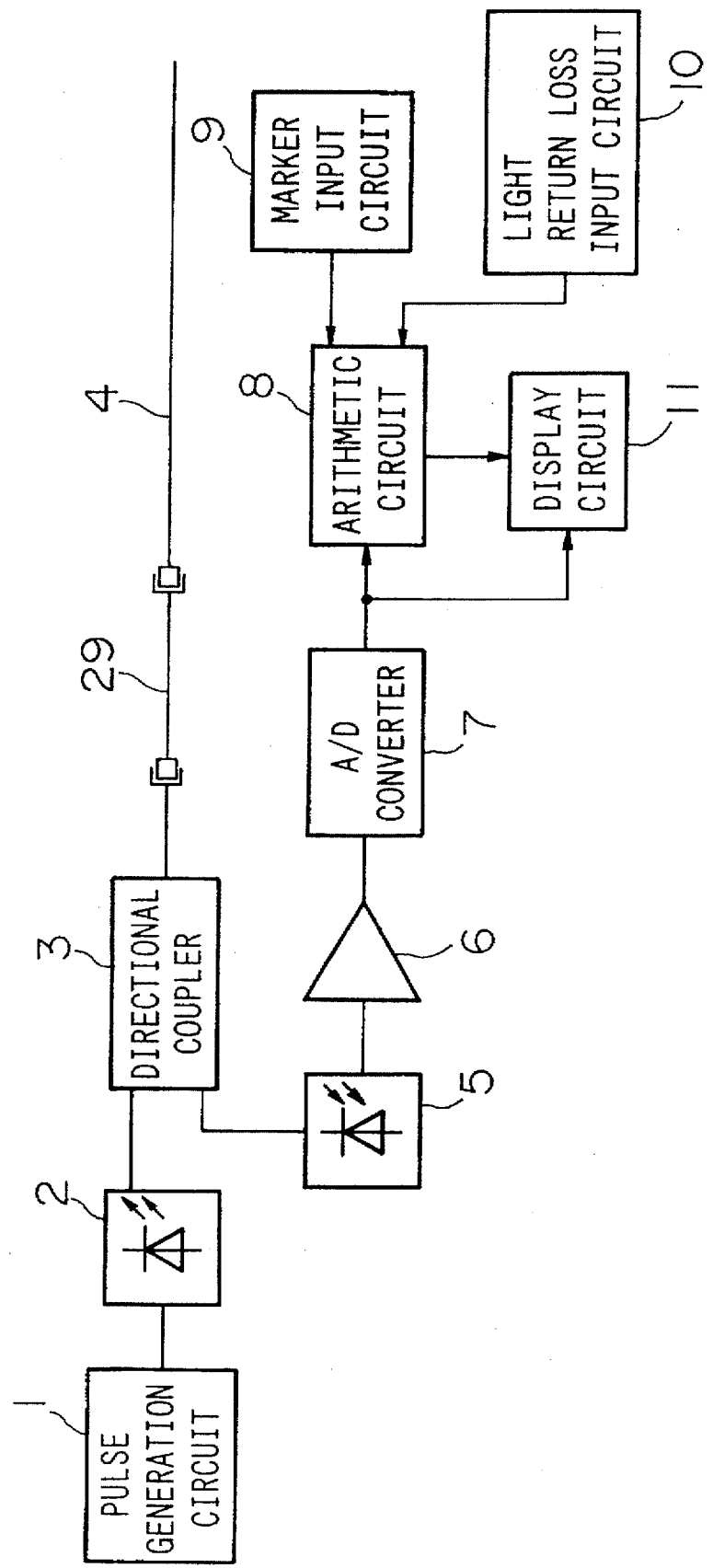
FIG. 4 is a configuration diagram of a working example of the present invention.

Next, the configuration of a working example of the present invention is explained, with reference to FIG. 4. In FIG. 4, in order to improve the accuracy of the light return loss measurement, a dummy optical fiber has been added between the directional coupler 3 and the optical fiber to be measured 4 of FIG. 1. In all other respects the figure is the same as FIG. 1. In FIG. 4, due to cross talking in the directional coupler 3, part of the light pulse output from the electricity-light conversion circuit 2 escapes into the light-electricity conversion circuit 5, causing errors in the measurement of the light return loss.

The Fresnel reflected light represented by interval 21 in FIG. 3, is a combination of the Fresnel reflected light from the optical connector linking the directional coupler 3 and the optical fiber 4, and the cross talk light from the directional coupler, and is not the light return loss due solely to the optical connector. In order to overcome this problem, a dummy optical fiber 29 is added, as shown in FIG. 4.

Figure 5:
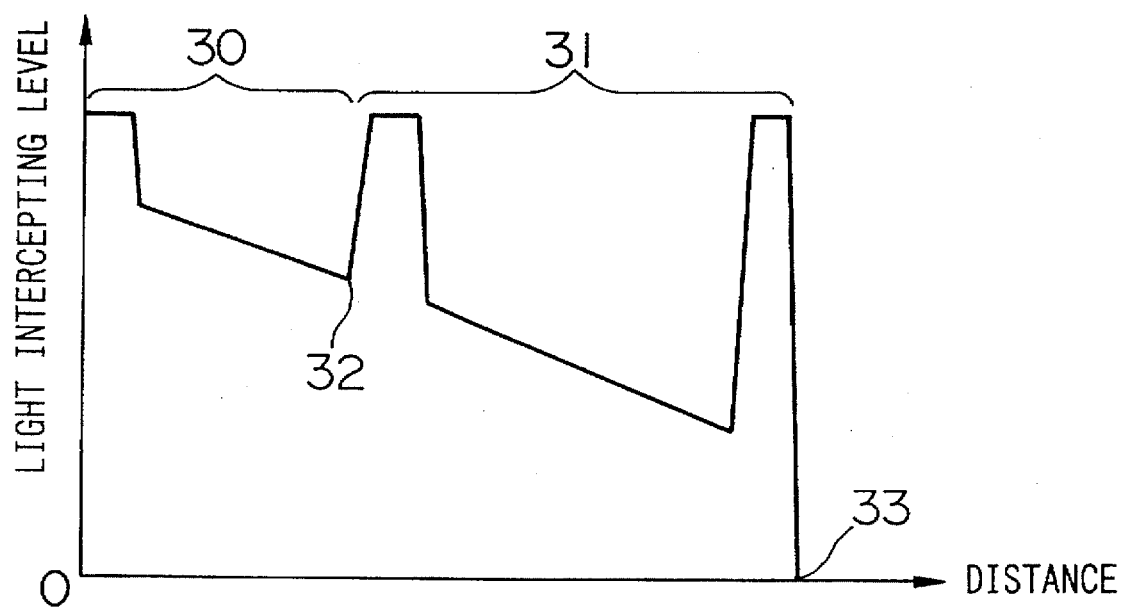
FIG. 5 shows an example of a measured wave form for the working example of FIG. 4.
Figure 6:
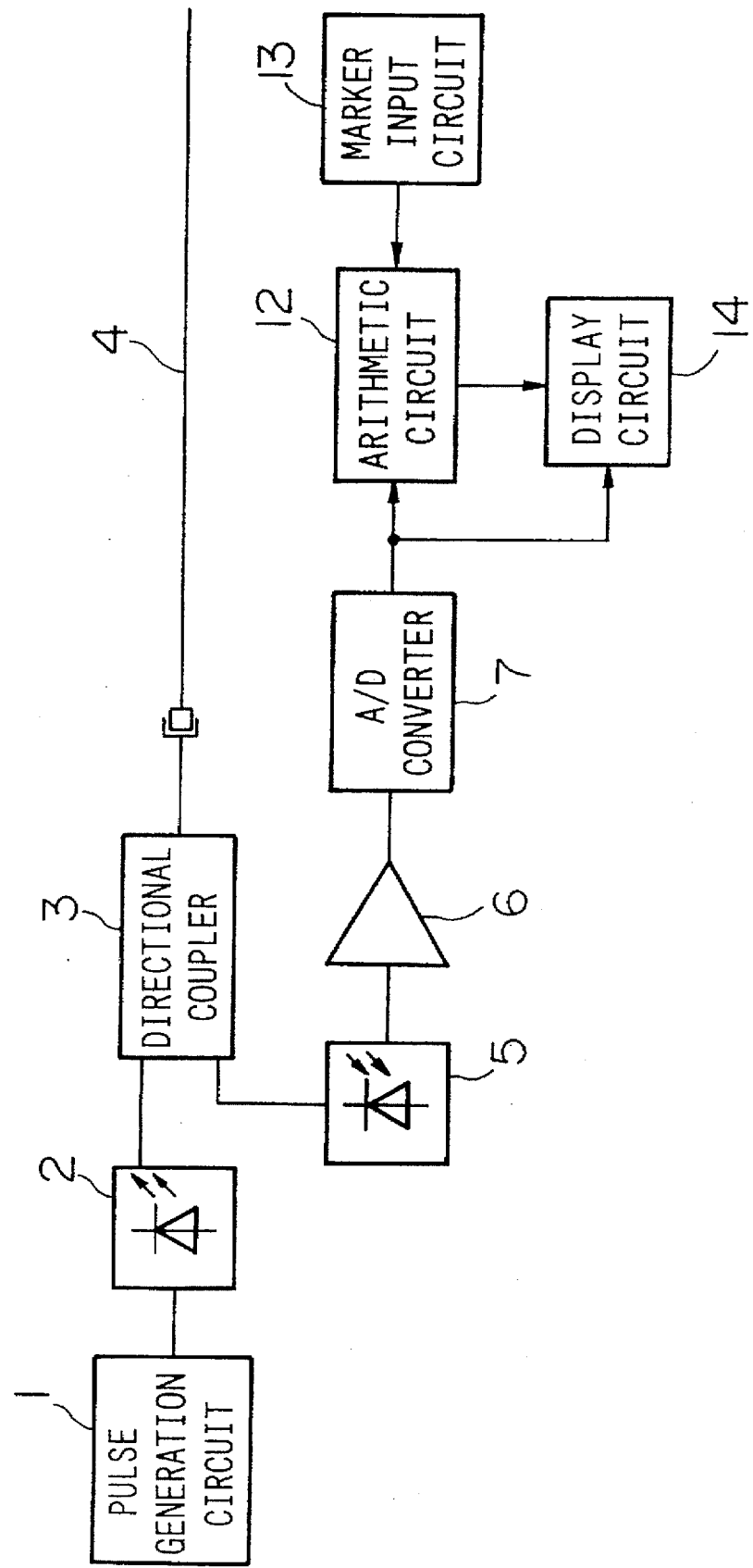
FIG. 6 is a configuration diagram of a currently used OTDR.

FIG. 5 shows an example measured wave form produced by the working example in FIG. 4. Numeral 30 in FIG. 5 represents the light interception wave form for the dummy optical fiber 29, and 31 the light interception wave form for the optical fiber to be measured 4. In order to determine the light return loss across the optical fiber 4, markers 32 and 33 are set at the boundaries of the interception wave form for the optical fiber 4. The cross talk light from the directional coupler 3 is included in the Fresnel reflected light at the left edge of the light interception wave form 30 of the dummy optical fiber 29, but has no effect on the light interception wave form 31 of the optical fiber to be measured 4.

In typical OTDRs, stepwise adjustment of the width of the light pulse transmitted to the optical fiber to be measured, and of the light interception circuit gain, is often possible. In such cases, the light interception gain correction constant G should be set for each of the various light pulse widths. The same is also true for stepwise adjustment of the light interception circuit gain. In OTDRs with an accurate light interception gain adjustment, a light interception gain correction constant G is set for a single light interception gain, while for other light interception gains, it is possible to use a light interception gain correction value obtained by adding the difference between the light interception gain and the measured light interception gain to the set light interception gain correction constant G.

What is claimed is:

1. A light return loss measurement system including an optical time delay reflectometer (OTDR) for displaying an output of an arithmetic circuit, said system comprising:

a pulse generation circuit for generating a pulse, an electricity-light conversion circuit for converting the output from said pulse generation circuit to a light pulse, a directional coupler for transmitting the output from said electricity-light conversion circuit to an optical fiber to be measured and for inputting the return light into said light-electricity conversion circuit for converting to an electrical signal, an A/D converter for converting the output from said light-electricity conversion circuit from an analog signal to digital signal, a display circuit for taking the output from said A/D converter and displaying a measured waveform data, a marker input circuit for setting a measurement interval in the measured waveform data displayed via said display circuit, an arithmetic circuit for calculating a light return loss across the measurement interval set by said marker input circuit, and a light return loss input circuit for inputting the light return loss for a calibration optical fiber having a predetermined light return loss value.

2. A light return loss measurement system as claimed in claim 1, characterized in that the returning light includes both backward scattered light and Fresnel reflected light.

3. A light return loss measurement system as claimed in claim 1, characterized in that a dummy optical fiber is inserted between said directional coupler and said optical fiber being measured.

4. A light return loss measurement system as claimed in claim 1, characterized in that a measurement value of the light return loss of said calibration optical fiber is a value obtained by integrating the measurement waveform data along the entire distance of the calibration optical fiber.

5. A light return loss measurement system as claimed in claim 2, characterized in that a measurement value of the light return loss of said calibration optical fiber is a value obtained by integrating the measurement waveform data along the entire distance of the calibration optical fiber.

6. A light return loss measurement system as claimed in claim 3, characterized in that a measurement value of the light return loss of said calibration optical fiber is a value obtained by integrating the measurement waveform data along the entire distance of the calibration optical fiber.

7. A light return loss measurement system as claimed in claim 1, characterized in that a value obtained by integrating is a quadrature based on a partitioned sum.

8. A light return loss measurement system as claimed in claim 2, characterized in that a value obtained by integrating is a quadrature based on a partitioned sum.

9. A light return loss measurement system as claimed in claim 3, characterized in that a value obtained by integrating is a quadrature based on a partitioned sum.

10. A light return loss measurement system as claimed in claim 4, characterized in that a value obtained by integrating is a quadrature based on a partitioned sum.

11. A light return loss measurement system as claimed in claim 5, characterized in that a value obtained by integrating is a quadrature based on a partitioned sum.

12. A light return loss measurement system as claimed in claim 6, characterized in that a value obtained by integrating is a quadrature based on a partitioned sum.

13. A method for measuring light return loss in a system including an optical time delay reflectometer (OTDR) for displaying an output of an arithmetic circuit, said method comprising the steps of:

setting a predetermined light return loss for a calibration optical fiber in a light return loss input circuit, connecting said calibration optical fiber, having said predetermined light return loss, to an OTDR and measuring the light return loss;

determining a light interception gain correction constant G in an arithmetic circuit by dividing said predetermined light return loss set in said light return loss input circuit by said measured light return loss;

connecting an optical fiber to be measured to said OTDR, and setting an arbitrary interval for which the light return is to be determined in a marker input circuit; and determining with said arithmetic circuit a light return loss value by integrating a measured waveform data for a set interval with respect to distance, multiplying the light return loss value by said light interception gain correction constant G, and then displaying a light return loss value R for the particular interval of said optical fiber set by said marker input circuit.

* * * * *